Figure 1:
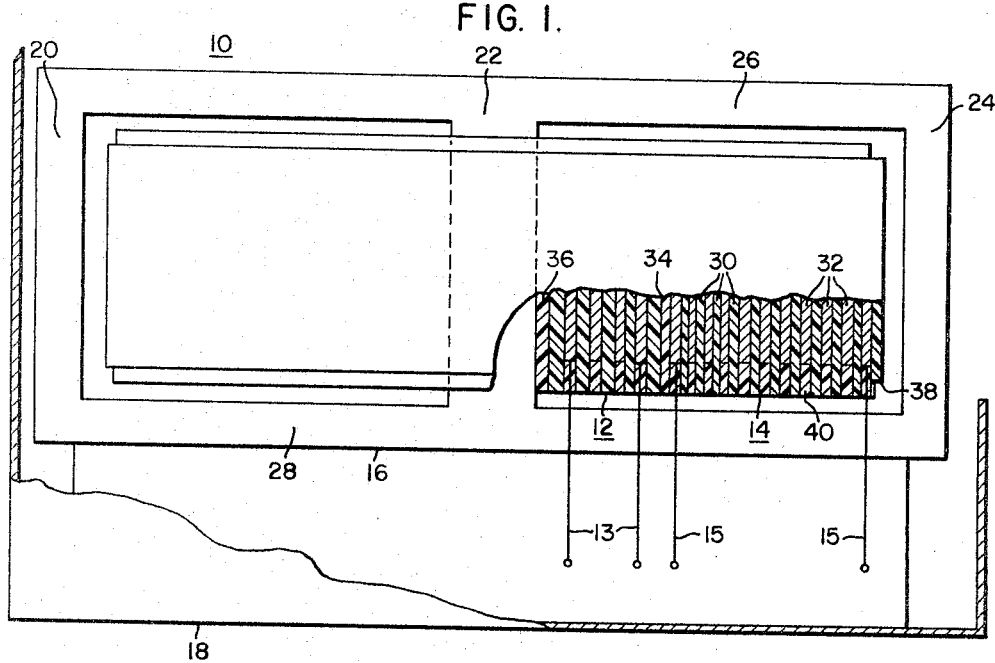

Feb. 28, 1967     A. M. LOCKIE ET AL     3,307,074
TRANSFORMER STRUCTURE WITH BUILT-IN OVERVOLTAGE PROTECTION
Filed Nov. 5, 1964

WITNESSES:
John L. Chopp
James F. Young

INVENTORS
Arthur M. Lockie and
Leonard L. Wright
BY Donald R. Lackey
ATTORNEY 3,307,074
TRANSFORMER STRUCTURE WITH BUILT-IN OVERVOLTAGE PROTECTION
Arthur M. Lockie, Hickory Township, Sharpsville County, and Leonard L. Wright, Sharon, Pa., assignors to Westinghouse Electric Corporation, East Pittsburgh, Pa., a corporation of Pennsylvania
Filed Nov. 5, 1964, Ser. No. 409,243
6 Claims. (Cl. 317—15)

This invention relates in general to electrical inductive apparatus and more particularly to electrical inductive apparatus that is completely self-protecting against overvoltage conditions, without requiring the aid of external overvoltage protective devices.

Most electrical inductive apparatus, such as transformers, are subjected to voltages greater than rated voltage during normal usage. Since it is economically impractical to provide additional electrical insulation to withstand the greatest surge voltage to which the apparatus may be subjected, the insulation is protected by means of auxiliary overvoltage or stress relief devices, such as lightning arresters, and the like. These overvoltage protective devices are costly and present many installation and operational problems. It would be desirable if electrical inductive apparatus could be adequately protected from overvoltage conditions without auxiliary protective devices and without the necessity of adding additional electrical insulation, which would substantially increase the space factor of the apparatus, as well as its cost.

Accordingly, it is an object of this invention to provide new and improved self-protecting inductive apparatus.

Another object of this invention is to provide new and improved inductive apparatus that protects itself from overvoltage conditions without auxiliary overvoltage protective devices.

A further object of the invention is to provide a new and improved electrical transformer that protects itself from overvoltage conditions without auxiliary overvoltage protective devices and without resorting to electrical insulation of sufficient thickness to withstand the maximum overvoltage to which the transformer may be subjected.

Briefly, the present invention accomplishes the above cited objects by providing a transformer which utilizes insulation that is a good electrical insulator during normal operating conditions, but will become a conductor upon being subjected to an overvoltage, allowing sufficient current to flow through the insulation to prevent it from being punctured. When the overvoltage condition ceases, the insulation will return to its original state of being an electrical insulator.

More specifically, electrical insulation of the polymeric resin type is used to provide turn-to-turn insulation, winding-to-winding insulation, and winding-to-ground insulation. To make the insulation self-protecting, finely divided particles of a material that has a voltage dependent resistivity, such as silicon carbide, is added to the insulation system. The concentration of particles, the particle size, and the thickness of the insulation is tailored to provide an insulation system that is a good electrical insulator with little or no leakage current at normal operating voltages. At voltages in excess of normal operating voltage, the insulation will conduct sufficient current to prevent a destructive breakdown. Thus, the insulation system serves the dual purpose of providing electrical insulation and of providing protection for overvoltage conditions.

Further objects and advantages of the invention will become apparent as the following description proceeds and features of novelty which characterize the invention will be pointed out in particularity in the claims annexed to and forming a part of this specification.

Figure 2:
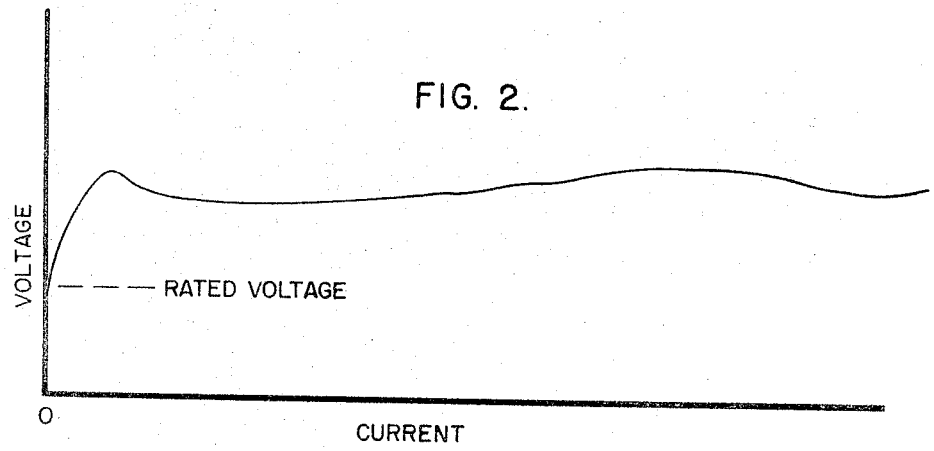

For a better understanding of the invention, reference may be had to the accompanying drawings, in which:

FIGURE 1 is a front elevation, partially in section, illustrating a transformer construction which may utilize the teachings of this invention; and FIG. 2 is a curve illustrating the current versus voltage characteristic of electrical insulation used in the invention.

Referring now to the drawings and FIG. 1 in particular, there is illustrated a transformer 10, partially in section, which may be constructed according to the teachings of this invention. The transformer 10 includes low voltage winding 12 and high voltage winding 14, disposed in inductive relation with magnetic core 16. The low voltage leads 13 and high voltage leads 15, are shown schematically. A casing 18, shown partially cut away, may enclose the magnetic core-winding assembly, if desired. Magnetic core 16 may be of the wound or of the stacked type, and constructed of a plurality of magnetic laminations assembled to provide leg portions 20, 22 and 24, connected by yoke portions 26 and 28. Windings 12 and 14 are concentrically disposed on center leg portion 22.

Windings 12 and 14 are formed from metallic conductive material, such as copper or aluminum, and may be in the form of strip or foil, as shown, or they may be of the wire type.

Because of economical reasons, the insulation provided in transformers is designed to withstand normal operating voltage, plus a certain factor of safety. Overvoltage protective devices are provided to protect the transformer insulation from transient surge voltages produced by switching, lightning, and other causes. By constructing the transformer 10 according to the teachings of this invention, auxiliary voltage protective devices are not required, thus reducing the cost of the apparatus and reducing installation, operational and maintenance problems.

The transformer insulation is formed from a polymeric resinous material, such as an epoxy or polyester. The resin is impregnated with finely divided particles of a material whose resistance is voltage dependent. Silicon carbide has been found to be excellent for this purpose. Advantage is taken of the fact that the conductivity curve of silicon carbide has two distinct regions. The curve shown in FIG. 2 illustrates a conductivity curve for silicon carbide and graphically illustrates these two regions. In the initial region, the voltage across the silicon carbide may be increased with very little conductivity occurring. Then, as the voltage continues to increase, a second region is reached in which the conductivity rapidly increases to an avalanche condition. The insulation, with the silicon carbide filler, is carefully tailored to provide the desired conductivity curve for the particular normal operating voltage it is to withstand. At the normal operating voltage, the leakage current should be negligible, and at higher voltages the insulation should allow sufficient current to flow to maintain the voltage within a predetermined maximum and prevent puncture of the insulation.

A transformer has widely different magnitudes of voltage stress that must be insulated against. For example, the transformer 10 shown in FIG. 1 has insulation 30 disposed between the conductor turns 32 that must withstand a relatively low voltage. Insulation 30 may be in the form of an enamel coating on the conductors 32, or may be in the form of interleaved film or sheet insulation. For example, if the insulation 30 is a coating, it may be a polyester, epoxy, or the like, filled with finely divided particles of silicon carbide. The exact concentration of silicon carbide, its particle size, and the thickness of the coating will depend upon the normal voltage between the turns of the strip conductor 32. Excellent results have been obtained using a concentration of silicon carbide particles having a concentration of 25% by volume of the coating. It will be understood, however, that good results may be obtained by using a greater or lesser concentration of silicon carbide, such as 15 to 50 percent by volume, by changing other parameters, such as the coating thickness.

Silicon carbide particle sizes in the range of 100 to 400 (U.S. Standard Sieve specification) have been found to be suitable. It is important that the insulation be absolutely uniform, so the uniformity of the particle size is more critical than the particle size itself. When the voltage stress between conductor turns reaches a point where substantial current starts to flow, the current flow should spread throughout similarly stressed insulation. If the coating is not uniform, current could flow at some locations and not at other locations in similarly stressed insulation. If the magnitude of current becomes too great at isolated locations, the heat developed could cause failure of the insulation. By providing insulation having a uniform concentration of silicon carbide, with a uniform particle size and uniform coating thickness, when the current starts to flow at one location it will immediately spread throughout the adjacent insulation, spreading the current and, therefore, the heat over a wide area and preventing the overvoltage condition from causing a failure of the insulation. Thus, when the overvoltage condition ceases, the insulation may return to its electrical insulating state without damage or any deterioration.

The remaining insulation, such as the high-low insulation 34 between windings 12 and 14, and winding-to-ground insulation, such as shown at 36, 38 and 40, may be in the form of solid discrete members formed of silicon carbide filled resinous material, or it may be solid cast insulation. If it is in the form of solid discrete members, the concentration of silicon carbide and its particle size may be tailored for each member, as well as selecting the thickness of the member. If the insulation is cast, then the mold should be designed to obtain the desired thickness of insulation at the various stress points, as the thickness will be the only parameter that can be varied, once the concentration and particle size of the silicon carbide is selected.

The resinous material may be a thermosetting material, such as a polyester, silicone or epoxy resin, or even a thermoplastic material may be used if the softening temperature of the thermoplastic is well above the operating temperature of the transformer.

The high-low insulation 34 and winding-to-ground insulation 36, 38 and 40, function in the same manner as described for the turn-to-turn insulation 30. The insulation has negligible leakage at normal operating voltages, but adjusts its resistance upon being subjected to an overvoltage condition, to allow sufficient current to flow to prevent puncture of the insulation. The uniformity of the insulation allows the current flow to spread throughout all the adjacent similarly stressed insulation, to ensure that the current that is allowed to flow will do so nondestructively.

In order to obtain the desired conductivity curve of the silicon carbide, in addition to controlling the concentration and particle size of the silicon carbide, and the thickness of the insulation, the silicon carbide particles may be oxidized. By controlling the temperature and pressure to which the silicon carbide particles are subjected, a coating of silicon dioxide of predetermined thickness may be formed on the particles. The silicon dioxide forms a resistive coating, and may be used to alter the conductivity curve of the silicon carbide.

Although the use of silicon carbide filled resinous insulation has been described relative to a single phase transformer of the foil or strip wound type, it will be understood that the teachings enumerated herein are applicable to any type transformer, or any type of electrical apparatus where protection against overvoltage conditions is desired.

The teachings of this invention have many advantages. The silicon carbide filled resinous insulation provides the dual function of being a good electrical insulator at normal operating voltages, and performs the function of an overvoltage protective device during overvoltage conditions. The insulation automatically assumes the proper resistance during an overvoltage condition to allow sufficient current to flow to prevent puncture of the insulation. By spreading the current flow over wide areas, the current produces little heating of the insulation, allowing it to perform its protective function repeatedly without damage or deterioration of the insulation. Overvoltage protective devices are completely eliminated, reducing installation and maintenance costs, as well as eliminating the cost of the device. Further, the size of the apparatus need not be increased over the size of conventional apparatus, as the insulation may be tailored to provide the desired conductivity curve without increasing the insulation thickness over conventional thicknesses used in apparatus which depend upon overvoltage devices for protection. The teachings of this invention may also be applied with great advantage to electrical inductive apparatus which has interleaved foil or strip windings for producing capacitance in series or parallel circuit relation with the windings, such as described in copending applications Serial No. 356,002, filed March 25, 1964, now Patent No. 3,210,706, Serial No. 248,839, filed November 22, 1962, now Patent No. 3,210,704 and Serial No. 322,820, filed November 11, 1963, now Patent No. 3,210,705, all assigned to the same assignee as the present application.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. Electrical apparatus comprising first means having an electrical potential of a predetermined magnitude during normal operation of said electrical apparatus, second means having a voltage dependent resistivity which allows substantially no current flow at the predetermined potential of said first means, said second means allowing current to flow at potentials in excess of said predetermined voltage, said second means being disposed in contact with said first means to provide electrical insulation for said first means, said second means protecting itself by allowing current to flow when the potential of said first means exceeds its predetermined magnitude.

2. Electrical inductive apparatus comprising electrical conductors having predetermined electrical potentials during normal operation of said inductive apparatus, means having a voltage dependent resistivity, said means being in contact with said electrical conductors and electrically insulating said electrical conductors when they are at their predetermined potentials, said means protecting itself from potentials in excess of said predetermined potentials by allowing sufficient current to flow to prevent puncture.

3. Electrical inductive apparatus comprising electrical conductors having predetermined electrical potentials during normal operation of said inductive apparatus, means having a voltage dependent resistivity, said means comprising silicon carbide particles disposed in a solid resinous binder, said means being in contact with said electrical conductors and electrically insulating said electrical conductors when they are at their predetermined potentials, said means automatically protecting itself from overvoltage conditions by allowing sufficient current flow during the overvoltage conditions to prevent puncture.

4. An electrical transformer comprising a plurality of windings having a plurality of conductors at predetermined potentials during normal operation of said transformer, means having a voltage dependent resistivity, said means including silicon carbon particles disposed in a resinous binder, said means disposed in contact with said plurality of conductors and windings, said means allowing substantially no current to flow at the predetermined potential of said conductors, said means protecting itself from potentials in excess of said predetermined potentials by allowing sufficient current to flow to prevent puncture when subjected to said excess potentials.

5. An electrical transformer comprising a plurality of windings each having a plurality of turns formed from strip conductive material, first means electrically insulating said turns from one another, second means electrically insulating said plurality of windings from one another, third means electrically insulating said plurality of windings from ground, said first, second and third means having voltage dependent resistivities which make them good electrical insulators at the normal potentials to which they are subjected, said first, second and third means allowing sufficient current to flow to prevent puncture when subjected to voltages in excess of the normal potentials.

6. An electrical transformer comprising a plurality of windings each having a plurality of turns formed from strip conductive material, first means electrically insulating said turns from one another, second means electrically insulating said plurality of windings from one another, third means electrically insulating said plurality of windings from ground, said first, second and third means including uniform particles of silicon carbide disposed in a resinous binder and having voltage dependent resistivities which make them good electrical insulators at the normal potentials to which they are subjected, said first, second and third means allowing sufficient current to flow to prevent puncture when subjected to voltages in excess of the normal potentials.

References Cited by the Examiner

UNITED STATES PATENTS

| | | | |
|---|---|---|---|
| 3,066,180 | 11/1962 | Vivsberg et al. | 174—73 X |
| 3,209,924 | 9/1965 | Book et al. | 317—15 X |
| 3,210,460 | 10/1965 | Suelman | 174—73 |

MILTON O. HIRSHFIELD, *Primary Examiner.*

R. V. LUPO, *Assistant Examiner.*